United States Patent [19]

Lin

[11] Patent Number: 5,829,154
[45] Date of Patent: Nov. 3, 1998

[54] TAPE MEASURE WITH FLEXIBLE BRAKING STRIPS

[76] Inventor: Lin Ping Lin, 3F-3, No. 2, Lane 18, Sec. 2, Chung Yang Rd., San Chung City, Taipei Hsien, Taiwan

[21] Appl. No.: 908,434

[22] Filed: Aug. 7, 1997

[51] Int. Cl.⁶ .................................................. G01B 3/10
[52] U.S. Cl. ...................... 33/767; 242/385.4; 242/384.7
[58] Field of Search ........................... 33/767, 755, 761, 33/769; 242/385, 385.2, 385.3, 385.4, 384.7, 381, 381.1, 381.2, 381.3, 381.6

[56] References Cited

U.S. PATENT DOCUMENTS

| | | | |
|---|---|---|---|
| 3,482,798 | 12/1969 | Kawaguchi | 242/381.6 |
| 4,765,557 | 8/1988 | Kahmann | 242/381.6 |
| 4,899,460 | 2/1990 | Kang | 33/767 |
| 4,903,912 | 2/1990 | Coughlin | 33/767 |
| 5,245,761 | 9/1993 | Waldherr | 33/767 |
| 5,395,069 | 3/1995 | Chen | 33/767 |
| 5,400,521 | 3/1995 | Waldherr | 242/385.4 |
| 5,657,551 | 8/1997 | Lin | 33/767 |

*Primary Examiner*—Thomas B. Will
*Assistant Examiner*—Andrew Hirshfeld
*Attorney, Agent, or Firm*—Rosenberg, Klein & Bilker

[57] ABSTRACT

Disclosed is a tape measure provided with flexible braking strips for conveniently controlling rewinding of the tape, about the reel of the tape measure. The braking strips have arcuate middle portions which are provided at concave surfaces with two rows of discontinued pressing blocks corresponding to circumferential edges of two side plates of the reel, such that when the arcuate middle portions of the braking strips projecting from the case of the tape measure are depressed, the pressing blocks frictionally contact with the circumferential edges of the reel and stop the reel from rotating backward, and therefore, the tape is prevented from rewinding after it has been pulled outward for measuring purpose.

1 Claim, 4 Drawing Sheets

PRIOR ART  FIG.1

TAPE MEASURE WITH FLEXIBLE BRAKING STRIPS

BACKGROUND OF THE INVENTION

Most of the tape measures presently available on the market almost have the same structure, that is, as shown in FIG. 1, have a length of tape A2 extendably wound around a reel A having two side plates A1, a case formed from a top half case B and a bottom half case B joined together by means of screws C to contain the reel A and the tape A2 between them, and an arcuate braking means D slidably attached to a peripheral wall of the case. When the braking means D is pushed toward a length of the tape A2 having been pulled out of the case, the tape A2 is stopped by the braking means D from being further pulled out or rewinding. That is, the tape A2 is temporarily held at a certain extended position. To release the tape A2, the braking means D must be pushed away from the tape A2. When there are multiple measurements to be done, considerable time is required to operate the braking means D. It is, of course, bothersome and time-consuming for the user to do so. In addition, it is possible the braking means D easily becomes fatigued if it is repeatedly used for a prolonged time. The braking means D will eventually lose its function of effectively holding an extended tape A2 in place, allowing the tape A2 to rewind unexpectedly during a measuring work. And, the tape A2 must be pulled out of the case again.

It is therefore tried by the inventor to develop a tape measure which eliminates the drawbacks existing in the braking means of conventional tape measures.

SUMMARY OF THE INVENTION

The tape measure according to the present invention is provided with flexible braking strips to control backward rotation of the tape reel inside the case of the tape measure. The flexible braking strips have arcuated middle portions and are provided at their concave surfaces with two rows of discontinued pressing blocks corresponding to circumferential edges of two side plates of the reel, such that when the arcuated portions of the braking strips projecting from the case of the tape measure are depressed, the pressing blocks frictionally contact with the circumferential edges of the reel and stop the reel from rotating backward and therefore permit the tape to stay in an extended position without being rewound after the tape has been pulled outward for measuring purpose. And, due to the fexibility of the braking strips, the braking strips can recover to their outward projecting position as soon as to the force applied on them disappears, and thereby, the tape reel is no longer stopped by the pressing blocks and shall immediately rotate backward to rewind the tape.

BRIEF DESCRIPTION OF THE DRAWINGS

The technical means and special structure adopted by the present invention to achieve the above object can be best understood from the following detailed description of the preferred embodiment and the accompanying drawings, wherein.

DETAILED DESCRIPTION OF THE PREFERRED EMBODIMENT

Figure 1:
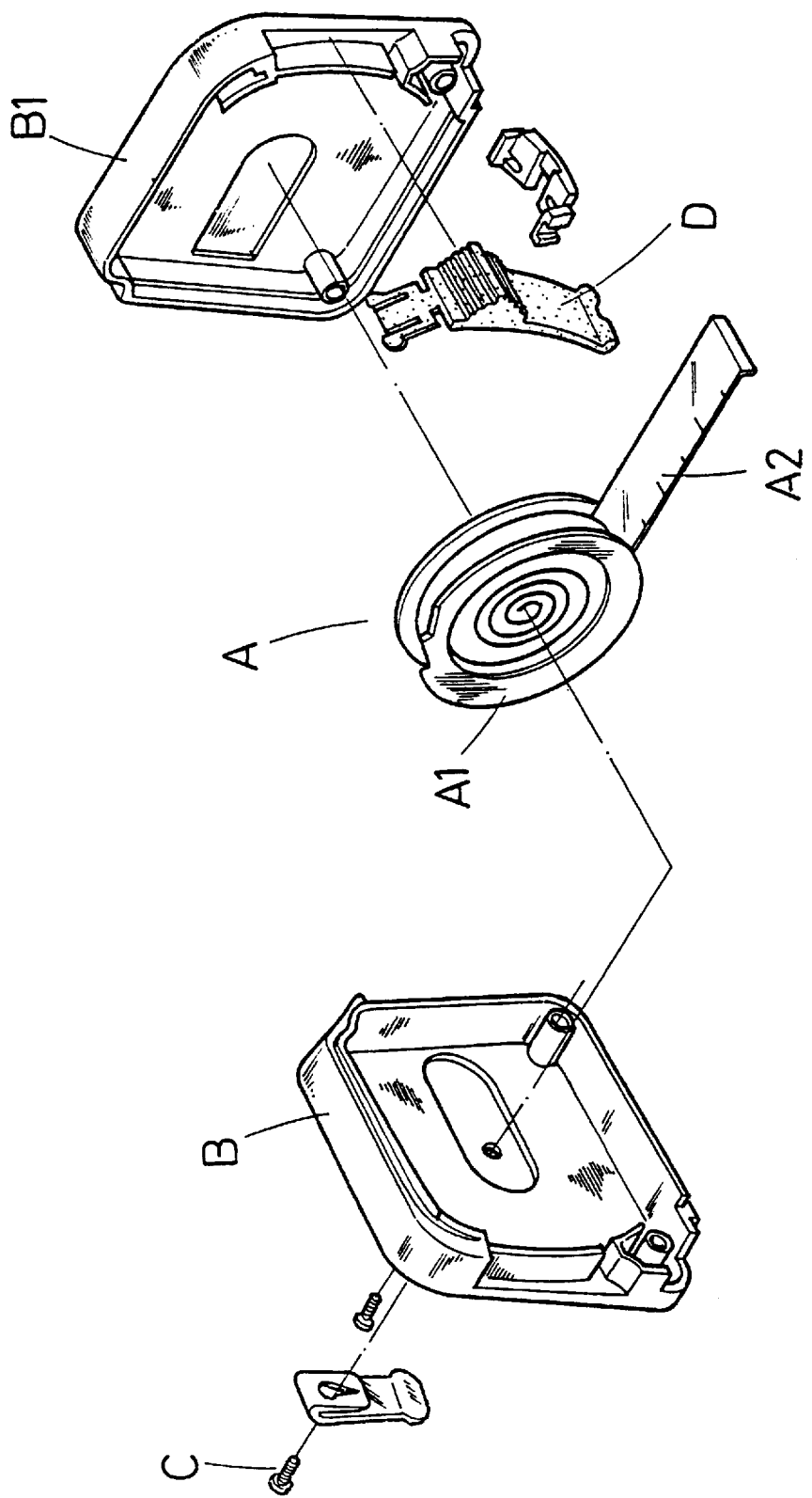
FIG. 1 is an exploded perspective of a conventional tape measure.
Figure 2:
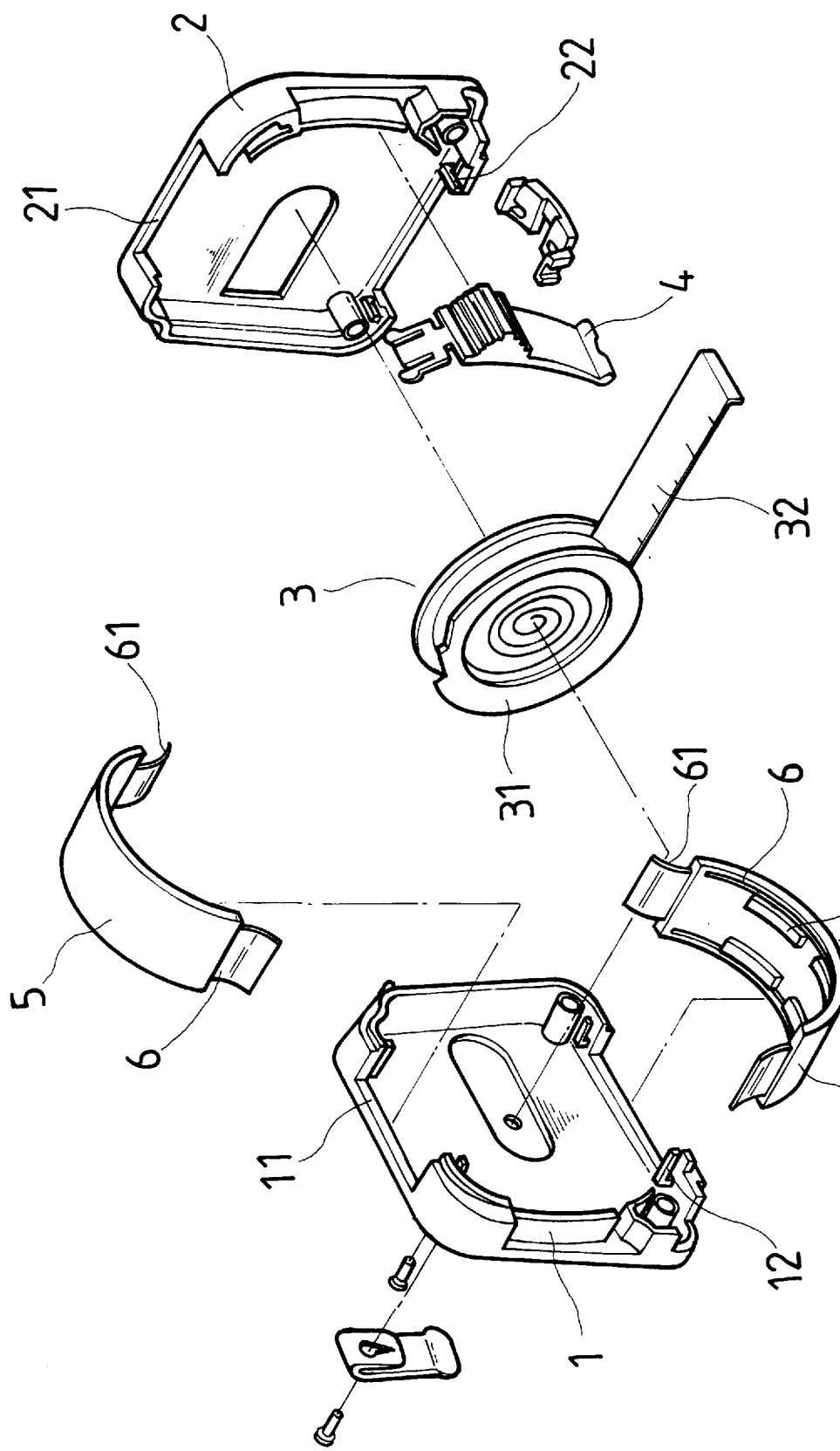
FIG. 2 is an exploded perspective of a tape measure according to the present invention.
Figure 3B:
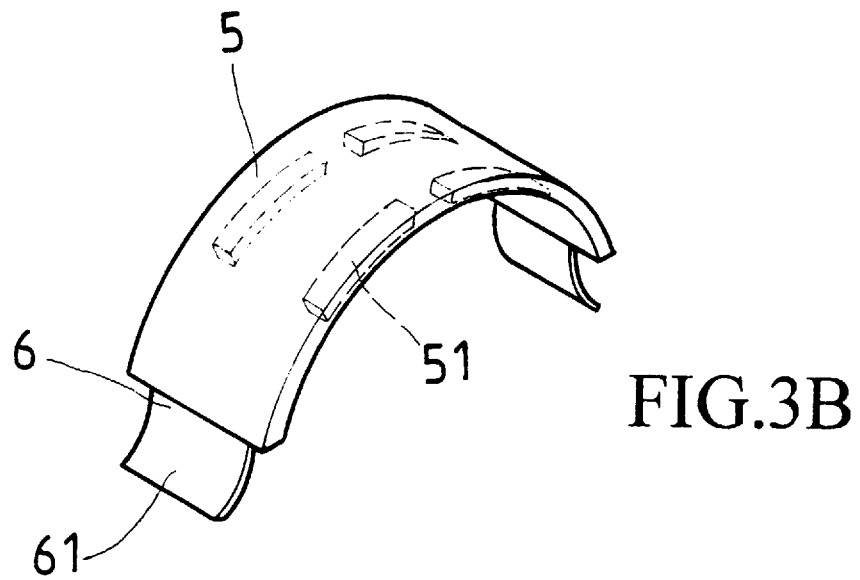
FIG. 3B is an enlarged, fragmentary, sectional view showing the relation between the braking strip and the pressing blocks.
Figure 3A:
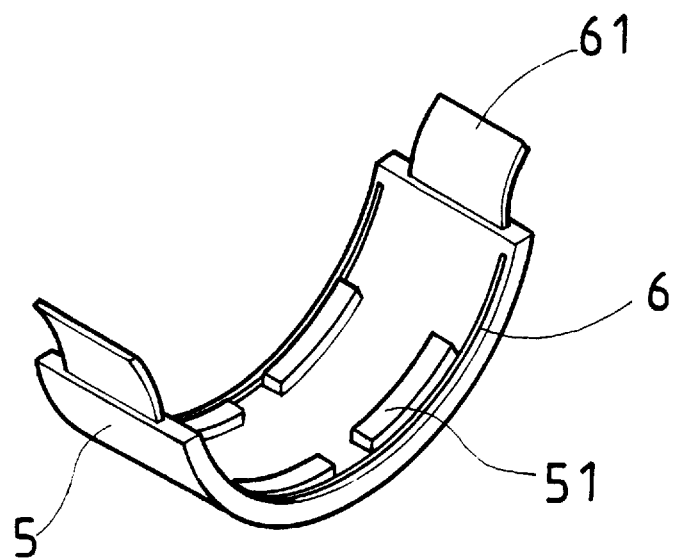
FIG. 3A is an enlarged perspective of the braking strips adopted in the tape measure of the present invention.

Please refer to FIG. 2. The present invention relates to a tape measure which mainly includes a first half case 1, a second half case 2, a tape reel 3, a braking means 4, and two braking strips 6 with pressing pads 5 wrapping thereof.

The first and the second half case 1 and 2 are closed to each other to form a case to accommodate the tape reel 3 therein. The first and the second half case 1 and 2 are joined together in a manner substantially the same as that of a conventional tape measure. The first half case 1 is formed at two opposite peripheral walls with two half-openings 11. Holding means 12 are provided in the first half case 1 adjacent to two ends of the two half-openings 11. Similarly, the second half case 2 is formed at two opposite peripheral walls with two half-openings 21 corresponding to the half-openings 11, and holding means 22 are provided in the second half case 2 adjacent to two ends of the two half-openings 21 corresponding to the holding means 12. Whereby, when the first and the second half cases 1 and 2 are closed together, the half-openings 11 and the half-openings 21 together form two complete openings on two opposite peripheral walls of the case of the tape measure, and each holding means 12 and its corresponding holding means 22 together form a channel in the case adjacent to one end of the complete opening.

The tape reel 3 is fixed in the case of the tape measure and further includes two side plates 31 for a tape 32 to wind about the reel 3 between the two side plates 31. A free end of the tape 32 can be freely pulled outward from the reel 3.

The braking means 4 is attached to one peripheral wall of the case formed from the first and the second half case 1 and 2 other than the peripheral walls having the half-openings 11 and 21. The free end of the tape 32 is retained two outside of the case of the tape measure, so that the tape 32 can be pulled outward from the reel 3 to extend out of the case. When the tape 32 is pulled out to a desired length, the braking means 4 can be pushed to press against the tape 32 to stop the tape 32 from moving. Since the reel 3 and the braking means 4 have structures and functions the same as that of a conventional tape measure, they are not described in details herein.

Please refer to FIGS. 2, 3A, 3B, and 4 at the same time. The braking strips 6 are each a long strip made of flexible material and having an arcuate middle portion. A convex surface of the arcuate middle portion of each braking strip 6 is wrapped up in a layer of pressing pad 5 while two ends 61 of each braking strip 6 are exposed to the air. The braking strips 6 wrapped by the pressing pads 5 are located in the openings formed from the half-openings 11 and 21 with two ends 61 inserted into the channels formed from the holding means 12 and 22, so that the arcuate middle portions of the braking strips 6 and accordingly the pressing pads 5 project out of the case via the openings. At a concave surface of each braking strip 6, that is, at an inner surface of the braking strip 6 that faces the reel 3 inside the case of the tape measure, two rows of discontinued pressing blocks 51 are formed along two longitudinal edges of the strip 6 to perpendicularly project therefrom. Positions of the two rows of pressing blocks 51 respectively correspond to two circumferential peripheries of the two side plates 31 of the reel 3, so that when the pressing pads 5 are depressed, the pressing blocks 51 shall frictionally contact with the circumferential peripheries of the reel 3.

To form a complete tape measure of the present invention, first insert two ends 61 of one braking strip 6 into two holding means 12 on the first half case 1, so that the braking strip 6 with pressing pad 5 wrapping a convex surface thereof projects from the half-opening 11. After another braking strip 6 is assembled to the other half-opening 11 and the reel 3 and the braking means 4 are fixed to the first half case 1, the second half case 2 is closed to the first half case 1 so that the braking strips 6 are located between the first and the second half cases 1 and 2 in the openings formed from the half-openings 11 and 21 and the ends 61 of the braking strips 6 are located in the channels formed from the holding means 12 and 22.

Figure 4:
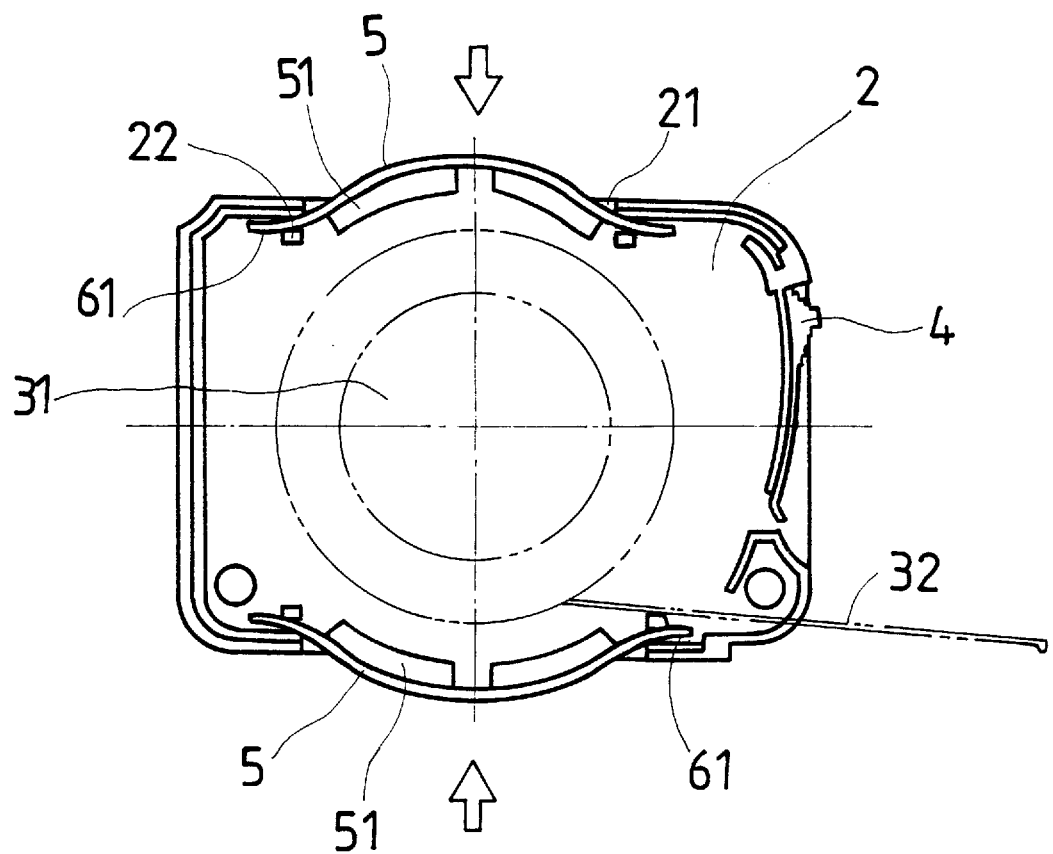
FIG. 4 illustrates the manner in which the present invention is operated to function.

Please refer to FIGS. 2 and 4 for an operation of the present invention. First, pull the tape 32 at its free end that is outside the case of the tape measure. When the tape 32 is pulled outward until a length to be measured is reached, the braking means 4 can be pushed toward the tape 32 to stop the tape 32 from moving. However, when the present invention is used to measure more than one distance one by one, a user may conveniently grip the case of the tape measure at the pressing pads 5 and presses against them with a palm, causing the pressing blocks 51 to frictionally contact with the side plates 31 of the reel 3 and thereby stop the reel 3 from rotating backward to rewind the tape 32. When a first distance has been measured with the present invention, the pressing pads 5 can be kept depressed or be released depending on the actual need. When the pressing pads 5 are released, flexibility of the arcuated braking strips 6 permits the pressing pads 5 to recover to their original outward projected positions. With the two pressing pads 5 depressed or released, the side plates 31 of the reel 3, and accordingly the reel 3 itself, can be freely controlled to stay unmoved or to rotate backward.

The pressing pads 5 may also protect the braking strips 6 from becoming easily broken when a strong pressing force is applied on the pressing pads 5. Moreover, there is more than one pressing block 51 contacting with the side plates 31 of the reel 3 and therefore a user can stop the backward rotation of the reel 3 in an effort-saving manner.

Following are the advantages of the present invention:
1. The present invention can be easily assembled.
2. A user may select to use either the braking means or the braking strips to control the rewinding of the tape.
3. When the braking strips are selected to control the rewinding of the tape, the tape can be further controlled to rewind at different speeds by releasing the depressed pressing pads to different degrees.

With the above arrangements, the tape measure of the present invention can be used in a more convenient, mobile and efficient manner.

What is claimed is:

1. A tape measure comprising a case, a tape reel having two side plates and being fixed in said case, a tape being wound about said tape reel between said two side plates with a free end located outside said case so that said tape can be pulled outward and rewound again, a braking means attached to a peripheral wall of said case for holding said tape in place after said tape has been pulled outward to a desired length, and two braking strips located in two openings formed at two opposite peripheral walls of said case other than said peripheral wall to which said braking means is attached; said braking strips each being made of flexible material and having an arcuate middle portion, said braking strips are so positioned that said arcuate middle portions project from said case via said openings, each said arcuate middle portion of said braking strips being provided at a convex surface thereof with a pressing pad and at a concave surface thereof with two rows of discontinued pressing blocks, and each said pressing blocks extending along two longitudinal edges of each said braking strip to correspond to circumferential edges of said two side plates of said reel, whereby when said braking strips are depressed, said pressing blocks are caused to frictionally contact with said circumferential edges of said side plates of said reel and stop said reel from rotating backward and said tape from rewinding about said reel when a measurement is taken, and when said braking strips are released to different degrees, said tape can be rewound at different speeds.

* * * * *